US012659783B2

(12) United States Patent
Zhao et al.

(10) Patent No.: US 12,659,783 B2
(45) Date of Patent: Jun. 16, 2026

(54) METHOD AND DEVICE FOR WIRELESS COMMUNICATION

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/460,200

(22) Filed: Sep. 1, 2023

(65) Prior Publication Data

US 2023/0413099 A1 Dec. 21, 2023

Related U.S. Application Data

(63) Continuation of application No. PCT/CN2021/136785, filed on Dec. 9, 2021.

(30) Foreign Application Priority Data

Oct. 28, 2021 (CN) .......................... 202111267362.3

(51) Int. Cl.
*H04W 28/02* (2009.01)
*H04L 5/00* (2006.01)

(52) U.S. Cl.
CPC ....... *H04W 28/0215* (2013.01); *H04L 5/0048* (2013.01); *H04W 28/0226* (2013.01); *H04W 28/0268* (2013.01)

(58) Field of Classification Search
CPC ......... H04W 28/0215; H04W 28/0226; H04W 28/0268; H04L 5/0048
See application file for complete search history.

(56) References Cited

U.S. PATENT DOCUMENTS 9,723,437 B1 * 8/2017 Bitra ...................... H04W 64/00
10,045,332 B2 * 8/2018 Kitazoe ............. H04W 56/0015
(Continued)

FOREIGN PATENT DOCUMENTS

CN 102595450 7/2012
CN 106454931 2/2017
(Continued)

OTHER PUBLICATIONS

International Search Report and Written Opinion in International Appln. No. PCT/CN2021/136785, mailed on Jul. 4, 2022, 9 pages (With partial English translation).
(Continued)

*Primary Examiner* — Parth Patel
(74) *Attorney, Agent, or Firm* — Fish & Richardson P.C.

(57) ABSTRACT

Embodiments of the disclosure provide a method and device for wireless communication. One example method includes: transmitting, by a terminal device, capability information indicating whether the terminal device supports determining a candidate of a measurement gap of positioning reference signal (PRS); receiving, by the terminal device, positioning measurement information of PRS sent by a location management function (LMF); determining, by the terminal device, a first measurement gap for positioning measurement of PRS according to the positioning measurement information of PRS; and transmitting, by the terminal device, information of the first measurement gap to a base station or to the LMF.

19 Claims, 6 Drawing Sheets

(56)                References Cited

U.S. PATENT DOCUMENTS

| | | | | |
|---|---|---|---|---|
| 11,689,951 | B2 * | 6/2023 | Bao | H04L 5/0053 |
| | | | | 370/329 |
| 11,800,486 | B2 * | 10/2023 | Manolakos | H04W 64/006 |
| 2007/0207824 | A1 * | 9/2007 | Bhattacharjee | H04W 24/10 |
| | | | | 455/524 |
| 2008/0189970 | A1 * | 8/2008 | Wang | H04W 36/0058 |
| | | | | 33/700 |
| 2010/0323720 | A1 * | 12/2010 | Jen | H04W 64/00 |
| | | | | 455/456.1 |
| 2013/0094393 | A1 * | 4/2013 | Cheng | H04W 24/00 |
| | | | | 370/252 |
| 2013/0121294 | A1 * | 5/2013 | Cheng | H04W 72/00 |
| | | | | 370/329 |
| 2013/0267246 | A1 * | 10/2013 | Wang | H04W 24/00 |
| | | | | 455/456.1 |
| 2016/0143027 | A1 * | 5/2016 | Kim | H04W 72/27 |
| | | | | 370/329 |
| 2017/0006426 | A1 * | 1/2017 | Fu | G01S 5/0236 |
| 2018/0302942 | A1 * | 10/2018 | Wu | H04W 36/0088 |
| 2020/0092737 | A1 * | 3/2020 | Siomina | H04W 8/24 |
| 2021/0058891 | A1 * | 2/2021 | Huang | H04W 24/10 |
| 2021/0067990 | A1 * | 3/2021 | Opshaug | H04W 4/029 |
| 2021/0329618 | A1 * | 10/2021 | Chervyakov | G01S 5/0221 |
| 2021/0337377 | A1 * | 10/2021 | Manolakos | G01S 5/0236 |
| 2022/0029763 | A1 * | 1/2022 | Manolakos | H04L 5/0048 |
| 2022/0046444 | A1 * | 2/2022 | Manolakos | H04L 5/0091 |
| 2022/0050163 | A1 * | 2/2022 | Si | H04W 24/10 |
| 2022/0086675 | A1 * | 3/2022 | Manolakos | H04W 64/006 |
| 2022/0225462 | A1 * | 7/2022 | Manolakos | H04W 8/24 |
| 2022/0240118 | A1 * | 7/2022 | Bao | H04W 64/006 |
| 2023/0031427 | A1 * | 2/2023 | Manolakos | H04W 64/003 |
| 2023/0037439 | A1 * | 2/2023 | Chuang | H04W 24/10 |
| 2023/0094358 | A1 * | 3/2023 | Manolakos | H04B 17/309 |
| | | | | 455/456.1 |
| 2023/0123943 | A1 * | 4/2023 | Yokokawa | H04W 88/02 |
| | | | | 370/252 |
| 2023/0156656 | A1 * | 5/2023 | Si | H04W 64/00 |
| | | | | 455/450 |
| 2023/0199522 | A1 * | 6/2023 | Manolakos | H04W 64/00 |
| | | | | 455/456.1 |
| 2023/0262649 | A1 * | 8/2023 | Si | H04L 5/0048 |
| | | | | 455/456.1 |
| 2023/0269700 | A1 * | 8/2023 | Shimoda | H04W 52/0245 |
| | | | | 455/456.5 |
| 2023/0283424 | A1 * | 9/2023 | Rao | H04L 5/0048 |
| | | | | 370/329 |
| 2023/0296718 | A1 * | 9/2023 | Kumar | G01S 5/0036 |
| | | | | 455/456.1 |
| 2023/0318781 | A1 * | 10/2023 | Bao | H04W 52/0216 |
| | | | | 370/311 |
| 2023/0328681 | A1 * | 10/2023 | Dong | H04W 76/20 |
| | | | | 455/456.1 |
| 2023/0362765 | A1 * | 11/2023 | Zheng | H04W 36/0088 |
| 2024/0187903 | A1 * | 6/2024 | Hasegawa | H04B 17/328 |
| 2024/0205872 | A1 * | 6/2024 | Manolakos | H04W 64/00 |
| 2024/0244469 | A1 * | 7/2024 | Axmon | H04W 72/1273 |
| 2024/0284389 | A1 * | 8/2024 | Zheng | H04W 76/20 |
| 2024/0353518 | A1 * | 10/2024 | Barbu | G01S 5/0257 |
| 2024/0406914 | A1 * | 12/2024 | Lee | G01S 5/00 |
| 2025/0024291 | A1 * | 1/2025 | Hwang | H04W 64/00 |
| 2025/0126590 | A1 * | 4/2025 | Vejlgaard | H04W 74/0816 |

FOREIGN PATENT DOCUMENTS

| | | | | |
|---|---|---|---|---|
| CN | 106559826 | | 4/2017 | |
| CN | 110958630 | | 4/2020 | |
| CN | 111356075 | | 6/2020 | |
| CN | 112583563 | | 3/2021 | |
| CN | 114501546 A | * | 5/2022 | |
| CN | 110958685 | | 4/2023 | |
| CN | 116034557 A | * | 4/2023 | |
| EP | 2574087 A1 | * | 3/2013 | ........ H04W 36/0088 |
| EP | 2648447 B1 | | 6/2016 | |
| JP | 2013526155 A | * | 6/2013 | .......... H04L 1/0027 |
| JP | 7299159 B2 | * | 6/2023 | ............ H04L 27/26 |
| WO | WO 2021120023 | | 6/2021 | |
| WO | WO 2021194274 | | 9/2021 | |

OTHER PUBLICATIONS

Office Action in Chinese Appln. No. 202111267362.3, mailed on Feb. 23, 2023, 10 pages (with English translation).
Office Action in Chinese Appln. No. 202111267362.3, mailed on Jul. 22, 2022, 16 pages (with English translation).
Extended European Search Report in European Appln. No. 21962194.3, mailed on Mar. 17, 2025, 11 pages.

* cited by examiner

METHOD AND DEVICE FOR WIRELESS COMMUNICATION

CROSS REFERENCE TO RELATED APPLICATIONS

This application is a continuation of PCT Patent Application No. PCT/CN2021/136785, filed Dec. 9, 2021, which claims priority to Chinese Patent Application No. 202111267362.3, filed on Oct. 28, 2021. The disclosures of the aforementioned applications are hereby incorporated by reference in their entireties.

TECHNICAL FIELD

The various embodiments described in this document relate in general to the technical field of communication, and more specifically to a method and device for wireless communication.

BACKGROUND

When a positioning system provides location services for terminal devices, the terminal device needs to perform positioning measurement on positioning reference signals (PRSs) to be measured sent by multiple base stations. At present, the protocol stipulates that the positioning measurement needs to be carried out within a measurement gap.

However, the measurement gap configured for the terminal device by a serving base station may be unable to cover the PRSs to be measured. If the measurement gap is unable to cover the PRSs to be measured, the terminal device needs to send a measurement gap reconfiguration request to the base station, to request the base station to reconfigure the measurement gap. Reconfiguration of the measurement gap may cause a time delay, which may lead to an increase of a positioning delay.

SUMMARY

Embodiments of the disclosure provide a method and device for wireless communication, which can reduce time delay.

According to a first aspect, embodiments of the disclosure provide a method for wireless communication. The method includes the following: a terminal device receives positioning measurement information of each of a plurality of positioning reference signals (PRSs) to be measured sent by a location management function (LMF); and the terminal device determines a first measurement gap for positioning measurement of the plurality of PRSs to be measured according to the positioning measurement information of each of the plurality of PRSs to be measured; where information of the first measurement gap is transmitted to a base station by at least one of the terminal device and the LMF.

According to a second aspect, embodiments of the disclosure provide a method for wireless communication. The method includes the following: a base station receives information of a first measurement gap transmitted by at least one of a terminal device and a location management function (LMF), where the first measurement gap is determined by the terminal device according to positioning measurement information of each of a plurality of position reference signals (PRSs) to be measured.

According to a third aspect, embodiments of the disclosure provide a method for wireless communication. The method includes the following: a location management function (LMF) transmits positioning measurement information of each of a plurality of positioning reference signals (PRSs) to be measured to a terminal device, where the positioning measurement information of each of the plurality of PRSs to be measured is used for the terminal device to determine a first measurement gap for positioning measurement of the plurality of PRSs to be measured; where information of the first measurement gap is transmitted to a base station by at least one of the terminal device and the LMF.

According to a fourth aspect, a device for wireless communication is provided. The device serves as a terminal device and includes a receiving unit and a determining unit. The receiving unit is configured to receive positioning measurement information of each of a plurality of positioning reference signals (PRSs) to be measured sent by a location management function (LMF). The determining unit configured to determine a first measurement gap for positioning measurement of the plurality of PRSs to be measured according to the positioning measurement information of each of the plurality of PRSs to be measured. Information of the first measurement gap is transmitted to a base station by at least one of the terminal device and the LMF.

According to a fifth aspect, a device for wireless communication is provided. The device serves as a base station and includes a first receiving unit configured to receive information of a first measurement gap transmitted by at least one of a terminal device and a location management function (LMF), where the first measurement gap is determined by the terminal device according to positioning measurement information of each of a plurality of position reference signals (PRSs) to be measured.

According to a sixth aspect, a device for wireless communication is provided. The device has a location management function (LMF) and includes a first transmitting unit. The first transmitting unit is configured to transmit positioning measurement information of each of a plurality of positioning reference signals (PRSs) to be measured to a terminal device, where the positioning measurement information of each of the plurality of PRSs to be measured is used for the terminal device to determine a first measurement gap for positioning measurement of the plurality of PRSs to be measured. Information of the first measurement gap is transmitted to a base station by at least one of the terminal device and the LMF.

According to a seventh aspect, a device for wireless communication is provided, including a memory for storing a program and a processor for invoking the program in the memory to perform the method as described in the first aspect.

According to an eighth aspect, a device for wireless communication is provided, including a memory for storing a program and a processor for invoking the program in the memory to perform the method in the second aspect.

According to a ninth aspect, a device for wireless communication is provided, including a memory for storing a program and a processor for invoking the program in the memory to perform the method in the third aspect.

According to a tenth aspect, there is provided a device including a processor for invoking a program from memory to perform the method in the first aspect.

According to an eleventh aspect, there is provided a device including a processor for invoking a program from memory to perform the method in the second aspect.

According to a twelfth aspect, there is provided a device including a processor for invoking a program from memory to perform the method in the third aspect.

According to a thirteenth aspect, there is provided a chip including a processor for invoking a program from a memory so that a device on which the chip is mounted executes the method in the first aspect.

According to a fourteenth aspect, there is provided a chip including a processor for invoking a program from a memory so that a device on which the chip is mounted executes the method in the second aspect.

According to a fifteenth aspect, there is provided a chip including a processor for invoking a program from a memory so that a device on which the chip is mounted executes the method in the third aspect.

According to a sixteenth aspect, there is provided a computer-readable storage medium having stored thereon a program causing a computer to perform the method in the first aspect.

According to a seventeenth aspect, there is provided a computer-readable storage medium having stored thereon a program causing a computer to perform the method in the second aspect.

According to an eighteenth aspect, there is provided a computer-readable storage medium having stored thereon a program causing a computer to perform the method in the third aspect.

According to a nineteenth aspect, there is provided a computer program product including a program that causes a computer to perform the method in the first aspect.

According to a twentieth aspect, there is provided a computer program product including a program that causes a computer to perform the method in the second aspect.

According to a twenty-first aspect, there is provided a computer program product including a program that causes a computer to perform the method in the third aspect.

According to a twenty-second aspect, a computer program is provided and the computer program causes a computer to perform the method of the first aspect.

According to a twenty-third aspect, a computer program is provided and the computer program causes a computer to perform the method of the second aspect.

According to a twenty-fourth aspect, a computer program is provided and the computer program causes a computer to perform the method of the third aspect.

The first measurement gap in the present disclosure may be determined by the terminal device, rather than configured by the base station for the terminal device. The terminal device can automatically determine the first measurement gap according to the positioning measurement information of the PRS to be measured, thereby avoiding the delay caused by the reconfiguration of the measurement gap and being beneficial to reducing the positioning delay. In addition, the terminal device or the LMF may transmit information of the first measurement gap to the base station, so that the base station can obtain the time period of the first measurement gap, avoiding collision between data communication and positioning measurement.

DETAILED DESCRIPTION OF THE EMBODIMENTS

In order to facilitate the understanding of the present disclosure, a communication system to which the embodiments of the present disclosure is applicable and a communication procedure are described below with reference to the accompanying drawings.

Figure 1:
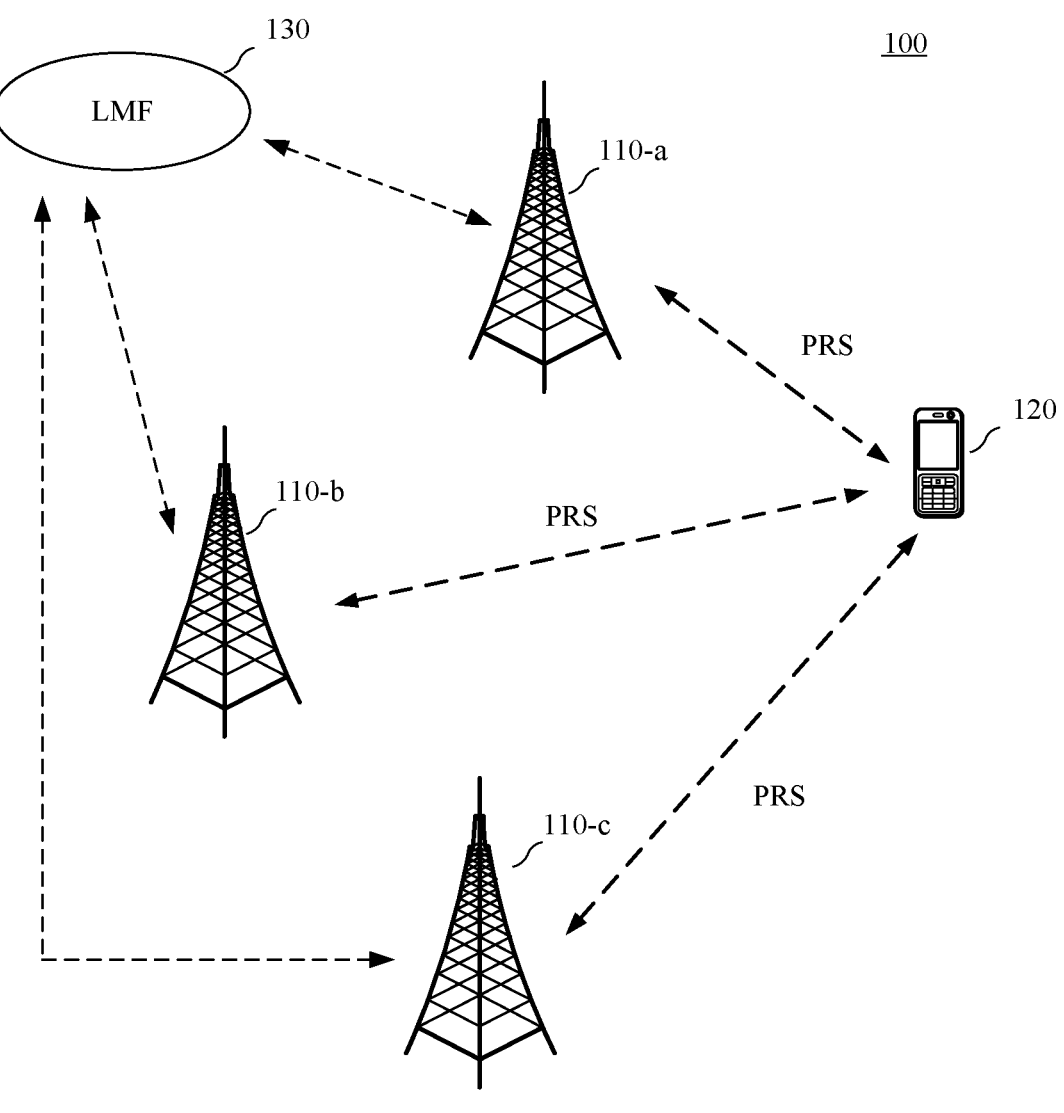
FIG. 1 is an architectural diagram of a wireless communication system according to embodiments of the present disclosure.

FIG. 1 is a wireless communication system 100 to which an embodiment of the present disclosure is applied. The wireless communication system 100 may include a base station 110 and a terminal device 120. The base station 110 may be a device that communicates with the terminal device 120. The base station 110 may provide communication coverage for a particular geographic area and may communicate with terminal devices 120 located within the coverage area.

FIG. 1 exemplarily illustrates three base stations and one terminal device. Optionally, the wireless communication system 100 may include other numbers of base stations and any number of terminal devices within an coverage area of each base station, which are not limited in embodiments of the present disclosure. A base station 110-*a* is a serving base station of the terminal device, and base stations 110-*b* and 110-*c* are neighboring base stations of the serving base station.

Alternatively, the wireless communication system 100 may further include other network entities such as network controllers, mobility management entities, and the like which are not limited by embodiments of the present disclosure. For example, the wireless communication system 100 may include a location management function (LMF) entity 130.

It shall be understood that technical solutions of the embodiments of the present disclosure may be applied to various communication systems, such as: 5th generation (5G) systems or new radio (NR) systems, 6G systems, long term evolution (LTE) systems, long term evolution (LTE) frequency division duplex (FDD) systems, LTE time division duplex (TDD) systems, and the like. The technical solutions provided in the present disclosure can also be applied to future communication systems, such as sixth generation mobile communication systems, satellite communication systems, and the like.

The terminal device in the embodiments of the present disclosure may also be referred to as a user equipment (UE), an access terminal, a subscriber unit, a subscriber station, a mobile radio station, a mobile station (MS), a mobile terminal (MT), a remote station, a remote terminal, a mobile device, a user terminal, a terminal, a device for wireless communication, a user agent, or a user device. The terminal device in an embodiment of the present disclosure may be a device providing voice and/or data connectivity to a user, and may be used to connect people, objects, and machines, such as a handheld device and a vehicle-mounted device that have a wireless connection function. The terminal device in the embodiments of the present disclosure may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, and a wireless terminal in smart homes, and the like.

The base station in embodiments of the present disclosure may be a device for communicating with the terminal device and may also be referred to as an access network device or a radio access network device. A base station in an embodiment of the present disclosure may be referred to as a radio access network (RAN) node (or device) that accesses a terminal device to a wireless network. The base station may also be referred to as a node B (NodeB), an evolved NodeB (eNB), a next generation NodeB (gNB), a relay station, an access point, a transmitting and receiving point (TRP), a transmitting point (TP), a master eNodeB (MeNB), a secondary eNodeB (SeNB), a multi-standard wireless (MSR) node, a home base station, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node, or the like, or a combination thereof. The base station may also be referred to as a communication module, a modem, or a chip that are provided in the device or apparatus. The base station may also be a network-side device in a 6G network, a device that undertakes the function of a base station in a future communication system, and the like. The base station may be a network that supports the same or different access technologies. The embodiment of the present disclosure is not limited to the specific technology and the specific equipment form adopted by the base station.

The base station may be a fixed or mobile base station. For example, a helicopter or unmanned aerial vehicle may be configured to act as a mobile base station and one or more cells may move depending on the location of the mobile base station. In other examples, the helicopter or the unmanned aerial vehicle may be configured to serve as a device for communicating with another base station.

In some deployments, the base station in embodiments of the present disclosure may be referred to as a CU or a DU. Alternatively, the base station may include a CU and a DU. The base station may further include an AAU.

Base stations and terminal devices can be deployed on land, including indoor or outdoor, hand-held, or vehicle-mounted. The base stations and the terminal devices can also be deployed on the water surface. The base stations and the terminal devices can also be deployed on airplanes, balloons, and satellites in the air. In the embodiments of the present disclosure, the scene in which the base station and the terminal devices are located is not limited.

It shall be understood that the communication device referred to in the present disclosure may be a base station or may also be a terminal device.

It shall also be understood that all or part of the functionality of the communication device in the present disclosure may also be implemented by software functionality running on hardware or by virtualization functionality instantiated on a platform (e.g., a cloud platform).

When the positioning system provides location services for the terminal device, the terminal device may perform measurement on a downlink (DL)-PRS sent by each of multiple base stations, to generate a measurement report, and report the measurement report to the LMF. The LMF can obtain a position information of the terminal device by performing position calculation according to reported information. The positioning process of the terminal device will be described in detail with reference to FIG. 2. It can be understood that the PRS described below may be referred to as DL-PRS.

At S202, a positioning client initiates a positioning service request to an access and mobility management function (AMF). The positioning client can also be called an external client. The positioning client may be an application (APP) connected to Internet. The APP may request position information of the terminal device from the AMF through the Internet.

At S204, the AMF transmits a positioning request for the terminal device to an LMF.

At S206, the LMF selects an appropriate PRS as a PRS to be measured of the terminal device according to configuration information of a corresponding PRS reported by each of a plurality of base stations. The plurality of base stations may include a serving base station of the terminal device and neighboring base stations, or the plurality of base stations are all neighboring base stations without including the serving base station.

The PRS to be measured can be at least one of a periodic PRS, an aperiodic PRS, and a semi-continuous PRS. The configuration information of the PRS may include at least one of periodic information of the PRS, a time domain resource location of the PRS, and a frequency domain resource location of the PRS.

At S208, the LMF transmits the configuration information of the PRS to be measured to the terminal device. The LMF transmitting the configuration information of the PRS to be measured to the terminal device means that the LMF transmits the configuration information of the PRS to be measured to the terminal device through the base station. The configuration information of the PRS to be measured is non-transparent to the base station, that is, the base station does not know content of the configuration information and only forwards the configuration information to the terminal device.

At S210, the terminal device performs measurement on the PRS to be measured according to the configuration information of the PRS to be measured. For example, the terminal device may perform measurement on the PRS to be measured at the time domain resource location and the frequency domain resource location of the PRS to be measured.

At S212, the terminal device generates a measurement report according to a measurement result of the PRS to be measured.

At S214, after the measurement report is generated, the terminal device may report the measurement report to the LMF.

At S216, the LMF performs position calculation based on the measurement report to determine a position of the terminal device.

The measurement report may include at least one of time information, distance information, and angle information. The LMF may determine the position of the terminal device based on at least one of the time information, the distance information, and the angle information. The time information may include, for example, a downlink reference signal time difference, a receive-transmit (RX-TX) time difference of the terminal device, and the like. The distance information may include a distance between the terminal device and the base station. The angle information may include information such as an uplink angle of departure (AoD), a downlink AoD, an uplink angle of arrival (AoA), a downlink (AoA), and the like.

Figure 3:
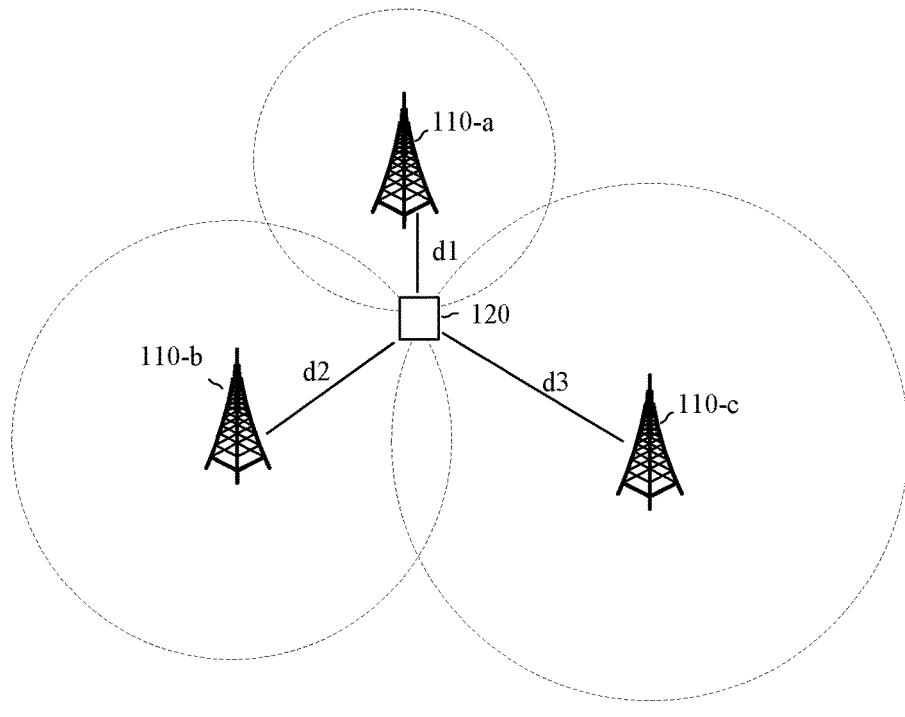
FIG. 3 is a schematic diagram of a method for determining a position of a terminal device by an LMF.

The following describes the distance information as an example of the measurement report to describe a way in which the LMF determines the position of the terminal device. As shown in FIG. 3, it is assumed that there are three base stations providing positioning service for the terminal device, which are designated as base station 110-a, base station 110-b, and base station 110-c, the terminal device needs to perform measurement on the PRS transmitted by each of the three base stations, and obtain three distance information, which are designated as d1, d2, and d3, respectively. The terminal device reports the three distance information to the LMF. Since a position of each of the three base stations is known, the LMF can perform position calculation using d1, d2, and d3 to determine the position of the terminal device.

At present, the protocol stipulates that the process of positioning measurement needs to be carried out within the measurement gap. The base station only schedules data outside the measurement gap, rather than within the measurement gap. In the measurement gap, the terminal device may not receive and send data. Therefore, the terminal device can perform positioning measurement within the measurement gap. There are two reasons for performing positioning measurement within the measurement gap.

1, The neighboring base stations and the serving base station may be out of sync. A timing of data communication of the terminal device is different from a timing of the PRS of the neighboring base station, which leads to the inability of the terminal device to carry out data communication and perform measurement on the PRS sent by neighboring base station at the same time. Therefore, the terminal device needs to carry out positioning measurement in the measurement gap without data communication.

2. If the positioning measurement is carried out outside the measurement gap, the chip processing capacity of the terminal device is required to be relatively high. During positioning measurement, the resolution of signal processing is relatively small, and the path needs to be resolved, so the complexity of signal processing is high. Due to the limitation of the chip processing capability, the chip is unable to encode, decode, and demodulate to receive and/or send data while the terminal device carries out the positioning measurement. Therefore, the terminal device needs to carry out positioning measurement in the measurement gap without data communication.

However, if the PRS to be measured is measured in the measurement gap, there will be a situation that the measurement gap configured for the terminal device by the serving base station is unable to cover the PRS to be measured, that is, a time period during which the PRS to be measured is located is outside the measurement gap. In this case, the terminal device needs to request the base station to reconfigure the measurement gap.

For example, after receiving the PRS to be measured sent by the LMF, the terminal device can determine whether the measurement gap covers the PRS to be measured according to a time period during which the PRS to be measured is located. If the measurement gap does not cover the PRS to be measured, the terminal device can send a measurement gap reconfiguration request to the base station through radio resource control (RRC) signaling. The base station reconfigures the measurement gap for the terminal device after receiving the measurement gap reconfiguration request sent by the terminal device. The base station can send a measurement gap reconfiguration response through the RRC signaling. After receiving the measurement gap reconfiguration response, the terminal device begins to measure the PRS to be measured based on the reconfigured measurement gap.

It can be seen from the above process that if the measurement gap is unable to cover the PRS to be measured, the base station needs to reconfigure the measurement gap, and the reconfiguration of the measurement gap may cause a time delay, which may increase the positioning delay of the terminal device. For some occasions with high delay requirements, the above positioning methods could not meet the delay requirements. For example, in order to meet the positioning requirements in vehicle positioning or industrial application scenarios, the protocol stipulates that the point-to-point delay of positioning is 100 ms, and the delay of the physical layer is 10 ms. However, the time delay of a positioning manner in which the measurement gap is reconfigured is unable to meet the time delay requirements specified in the protocol.

In order to reduce the positioning delay, some people put forward that the positioning measurement can be carried out outside the measurement gap, rather than within the measurement gap. However, there may have following defects.

1. Performing positioning measurement outside the measurement gap requires high requirement on the terminal device. In other words, only the terminal device with high processing ability can carry out data communication while carrying out positioning measurement. In addition, since data communication requires the computing capability of the chip, if the terminal device performs data communication and positioning measurement at the same time, a duration for the positioning measurement may be increased, and thus there may be a positioning delay.

2. This scheme requires the cooperation of data communication and positioning measurement. However, the PRS to be measured is configured for the terminal device by the LMF, and the base station does not know the content of the configuration information of the PRS to be measured (such as the PRS of the neighboring base station). Therefore, when the base station schedules data, the data may conflict with the PRS of the neighboring base station. In addition, if the positioning measurement and the data communication are performed simultaneously, the timing of the PRS of the neighboring base station and the timing of the local cell need to be synchronized, which may limit the PRS of the neighboring base station that the terminal device can receive. That is, the terminal device can only receive the PRS transmitted by the base station synchronized with the serving base station, which reduces the performance of the positioning detection.

3. When data resource, synchronization signal blocks (SSBs), and positioning measurement resource conflict, conflicts can be resolved by making a priority order. However, prioritizing may undoubtedly increase the complexity of the standard and the burden on the scheduler.

It can be seen from the above that there are some technical defects when the terminal device performs the positioning measurement outside the measurement gap. In other words, the terminal device still needs to carry out the positioning measurement within the measurement gap. However, how to reduce the positioning delay needs to be solved when positioning measurement is carried out within the measurement gap.

In order to reduce the positioning delay, embodiments of the present disclosure provide a method for wireless communication, the positioning delay may be reduced by autonomously determining a first measurement gap by the terminal device. In other words, the terminal device does not depend on the measurement gap configured by the base station, and even if the PRS to be measured does not fall within the measurement gap, the terminal device can autonomously determine the first measurement gap and directly enters the first measurement gap autonomously to perform positioning measurement. In the above process, the terminal device does not need to transmit a measurement gap reconfiguration request to the base station, and waits for the base station to respond to the measurement gap reconfiguration request, thereby saving the time for reconfiguration of the measurement gap and reducing the time delay of the positioning measurement.

When the terminal device autonomously determines the first measurement gap, the base station does not know information of the first measurement gap determined by the terminal device. The base station still schedules data for the terminal device within the first measurement gap determined autonomously by the terminal device. When the data scheduled by the base station collides with the PRS sent by the neighboring base station, the positioning accuracy may be affected and the positioning delay may be increased. Therefore, the information of the first measurement gap in the embodiments of the present disclosure can also be sent to the base station by the terminal device and/or the LMF, so that the base station can know the information of the first measurement gap, and avoid data scheduling in the first measurement gap, and avoid resulting in conflict between data communication and positioning measurement.

Figure 4:
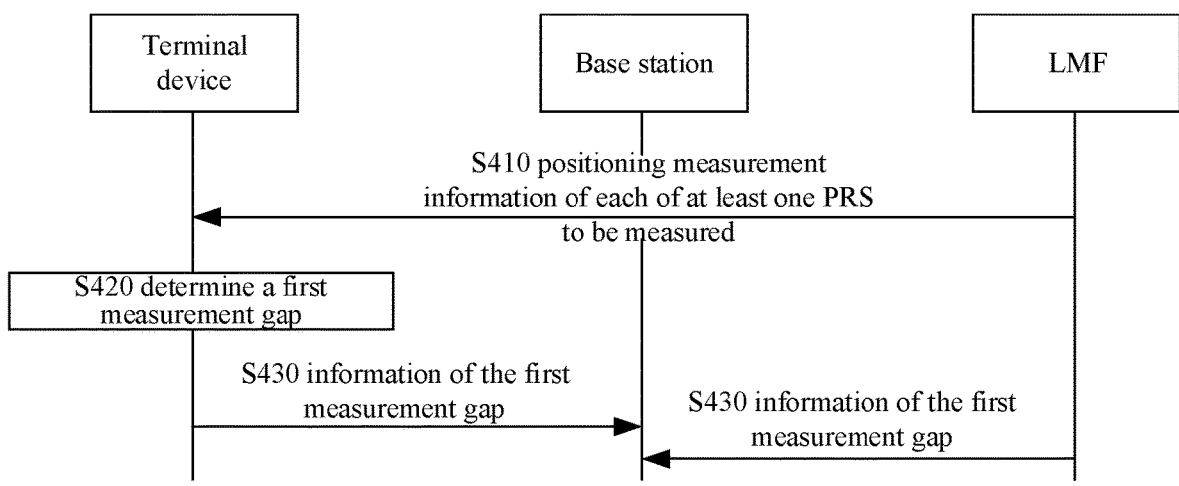
FIG. 4 is a schematic flow chart of a method for wireless communication according to embodiments of the present disclosure.

The method for wireless communication provided in the embodiments of the present disclosure may be described in detail with reference to FIG. 4. The method shown in FIG. 4 can be applied to a terminal device, a base station, and an LMF. The base station may be a serving base station of the terminal device. The method shown in FIG. 4 begins at S410.

At S410, the LMF sends positioning measurement information of each of at least one PRS to be measured to the terminal device.

The at least one PRS to be measured may include a PRS of each of a plurality of base stations. The plurality of base stations may include a serving base station of the terminal device and neighboring base stations, or the plurality of base stations are all neighboring base stations.

Before sending the positioning measurement information of the at least one PRS to be measured to the terminal device, the LMF can also receive configuration information of a corresponding PRS reported by each of a plurality of base stations. The LMF can determine the at least one PRS to be measured according to the configuration information of the corresponding PRS reported by each of a plurality of base stations.

At S420, the terminal device determines a first measurement gap for positioning measurement of the at least one PRS to be measured according to the positioning measurement information of each of the at least one PRS to be measured.

The terminal device determining the first measurement gap may mean that the terminal device determines the first measurement gap autonomously. That is, the first measurement gap is not configured for the terminal device by the base station.

The positioning measurement information of the PRS to be measured can include the configuration information of the PRS to be measured, such as a time domain resource location, a frequency domain resource location, and other information of the PRS to be measured. The terminal device can determine the first measurement gap according to the time domain resource location of the PRS to be measured. The first measurement gap can include the time domain resource location of the PRS to be measured. That is, the first measurement gap can cover a time period during which the PRS to be measured is located.

At S430, the terminal device transmits information of the first measurement gap to the base station, or the LMF transmits the information of the first measurement gap to the base station.

In other words, the information of the first measurement gap may be transmitted to the base station by the terminal device and/or the LMF. Alternatively, the information of the first measurement gap may be transmitted to the base station by the terminal device and/or the LMF after the positioning service request. The positioning service request may be initiated by a positioning client and may be used to request position information of the terminal device.

Figure 2:
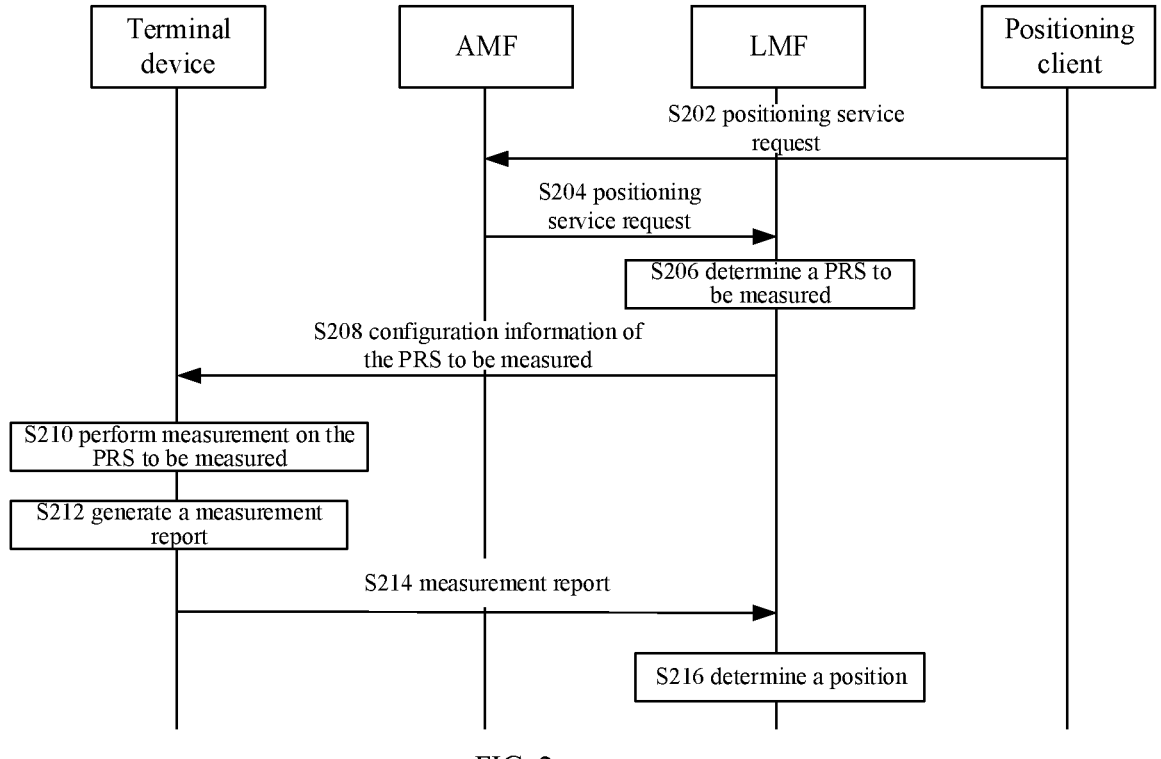
FIG. 2 is a schematic flow chart of a conventional positioning method.

The following takes FIG. 2 as an example for illustration. The positioning client can send a positioning service request to the AMF to request position information of the terminal device. After the positioning client sends the positioning service request, the LMF can send the positioning measurement information of each of the at least one PRS to be measured to the terminal device. The terminal device can determine the first measurement gap according to the positioning measurement information of each of the at least one PRS to be measured. Furthermore, the terminal device may transmit the information of the first measurement gap to the base station.

The information of the first measurement gap may be transmitted to the base station by the terminal device through physical layer signaling, such as uplink control information (UCI). That is, the terminal device may transmit the information of the first measurement gap to the base station through the physical layer signaling. The transmission delay can be reduced by sending the information of the first measurement gap through the physical layer signaling. Alternatively, the information of the first measurement gap may be transmitted to the base station by the LMF through the NR positioning protocol A (NRPPa), that is, the LMF may transmit the information of the first measurement gap to the base station through the NRPPa. The transmission delay can be reduced by transmitting the information of the first measurement gap through the NRPPa.

A time point at which the terminal device and/or the LMF transmit the information of the first measurement gap to the base station can be earlier than a time point at which the first of PRSs to be measured is received. In other words, a time point at which the base station receives the first measurement gap can be earlier than the time point at which the first of the PRSs to be measured is received, so that the base station can know a time of the first measurement gap as early as possible, such that the data scheduling for the terminal device after the time point at which the first of the PRSs to be measured is received can be avoided, thus avoiding the conflict between positioning measurement and data communication.

The information of the first measurement gap may be transmitted to the base station by the terminal device or may be transmitted to the base station by the LMF. When the LMF determines the PRS to be measured that is needed to be measured by the terminal device, the LMF can know the time domain resource location of the PRS to be measured, so that the first measurement gap can be directly determined. The LMF can directly send the information of the first measurement gap to the base station. Compared with the scheme in which the terminal device transmits the information of the first measurement gap to the base station, the LMF transmitting the information of the first measurement gap to the base station may have a lower time delay, which can save the time for the terminal device to receive the positioning measurement information of each of the at least one PRS to be measured. The reason is that the terminal device needs to receive the positioning measurement information of each of the at least one PRS to be measured sent by the LMF before determining the first measurement gap and sending the information of the first measurement gap to the base station.

The information of the first measurement gap may be determined by the terminal device, or may be notified to the terminal device by the LMF, which is not specifically limited in embodiments of the present disclosure. For example, the terminal device may determine the first measurement gap according to the time domain resource location of the PRS to be measured. For another example, the LMF may determine the first measurement gap according to the time domain resource location of the PRS to be measured. The LMF can send the information of the first measurement gap to the terminal device, whereby the terminal device can obtain the information of the first measurement gap. The LMF can send the information of the first measurement gap to the terminal device through the positioning measurement information of each of the at least one PRS to be measured. That is, the information of the first measurement gap can be included in the positioning measurement information of each of the at least one PRS to be measured.

The LMF may determine the first measurement gap in a manner similar to a manner in which the terminal device determines the first measurement gap. The following describes the terminal device determining the first measurement gap as an example to illustrate determination process of the first measurement gap.

In some embodiments, the first measurement gap may be a measurement gap configured in the protocol, such as a measurement gap in a measurement gap configuration table shown in Table 1 below. The measurement gap configuration table shown in Table 1 includes pattern serial numbers of different measurement gaps, and length information and repetition period information of a measurement gap corresponding to each of the pattern serial numbers.

TABLE 1

| Measurement gap pattern serial number | Measurement gap length | Measurement gap repetition period |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

Taking Table 1 as an example, the terminal device may select a first measurement gap from the measurement gap configuration table shown in Table 1. For example, the terminal device may select a first measurement gap from the measurement gap configuration table according to the time domain resource location of each of the at least one PRS to be measured. When the terminal device selects the first measurement gap, the terminal device may select a measurement gap that can include the time domain resource location of the PRS to be measured.

The measurement gaps in the measurement gap configuration table may be pre-stored in the terminal device, or may be transmitted to the terminal device by the base station, or may be agreed in the protocol, which are not limited in embodiments of the present disclosure. For example, the base station may send the measurement gap configuration table to the terminal device, so that the terminal device selects the first measurement gap from the measurement gap configuration table. For another example, the base station may select a plurality of measurement gaps (or candidate measurement gaps) from the measurement gap configuration table and transmit the candidate measurement gaps to the terminal device. After receiving the plurality of measurement gaps, the terminal device selects the first measurement gap from the candidate measurement gaps. That is, the first measurement gap is one of the candidate measurement gaps.

The information of each candidate measurement gap may include at least one of a sequence number of the measurement gap (measurement gap sequence number), a measurement gap length (MGL), and a measurement gap repetition period (MGRP).

The sequence number of the measurement gap can be the pattern serial number of the measurement gap in Table 1, or the sequence number of the measurement gap can be the serial number customized by the base station. After selecting the candidate measurement gaps from the measurement gap configuration table, the base station may also regenerate the sequence number for the candidate measurement gaps. For example, the base station may reorder the candidate measurement gaps and generate sequence numbers for the candidate measurement gaps in sequence. When the base station sends the candidate measurement gaps to the terminal device, the base station can send the customized sequence numbers of the candidate measurement gaps to the terminal device.

The information of the first measurement gap may include a serial number of the first measurement gap. After selecting the first measurement gap, the terminal device may send the serial number of the first measurement gap to the base station.

In other embodiments, the first measurement gap may also be a measurement gap customized by the base station. For example, the base station can determine a measurement gap length and a measurement gap repetition period, and other information of the measurement gap. Furthermore, the base station may transmit information of each candidate measurement gap to the terminal device, and the information of each candidate measurement gap may include at least one of a measurement gap sequence number, a measurement gap length, and a measurement gap repetition period. Understandably, the measurement gap sequence number can be a sequence number customized by the base station.

The terminal device can select the first measurement gap from the candidate measurement gaps according to positioning measurement information of each of the at least one PRS to be measured, that is, the first measurement gap is one of the candidate measurement gaps. In addition, the terminal device can also send the sequence number of the first measurement gap to the base station. That is, the information of the first measurement gap includes the sequence number of the first measurement gap.

In other embodiments, the first measurement gap may also be a measurement gap customized by the terminal device. For example, the terminal device may determine the time domain resource location of the PRS to be measured as the first measurement gap. For another example, the terminal device may increase a preset time based on the time domain resource location of the PRS to be measured, thereby generating a first measurement gap. The preset time can be used for radio frequency (RF) switching of the terminal device.

The information of the first measurement gap may include at least one of a pattern serial number of the first measurement gap, a start time of the first measurement gap, and an end time of the first measurement gap. After the information of the first measurement gap is sent to the base station, the base station can know the time domain resource location of the first measurement gap, so that the base station can schedule data outside the first measurement gap, thereby avoiding the conflict between data communication and positioning measurement.

The pattern serial number of the first measurement gap may be the pattern serial number in Table 1. After receiving the serial number of the first measurement gap, the base station can query the first measurement gap corresponding to the serial number from Table 1, so that information such as the length of the first measurement gap and the repetition period of the first measurement gap can be determined.

In addition, the start time of the first measurement gap may enable the base station to know when the terminal device will begin to enter the first measurement gap, and the base station may not schedule data for the terminal device from the start time of the first measurement gap. The end time of the first measurement gap may enable the base station to know when the terminal device ends the first measurement gap, and the base station can schedule data for the terminal device after the end of the first measurement gap.

The start time of the first measurement gap may be determined by the terminal device autonomously, or may be notified to the terminal device by the LMF, which is not specifically limited in the embodiments of the present disclosure. For example, the terminal device can determine the start time of the first measurement gap according to the time period in which the PRS to be measured is located. For another example, the LMF can determine the start time of the first measurement gap according to the time domain resource location of the PRS to be measured, and send the start time of the first measurement gap to the terminal device, so that the terminal device can obtain the start time of the first measurement gap.

Embodiments of the present disclosure are not specifically limited to a obtaining manner of the start time of the first measurement gap. For example, the start time of the first measurement gap may be a time of receiving (i.e., a start reception time) the first of the PRSs to be measured. For another example, the start time of the first measurement gap is earlier than the time of receiving the first of the PRSs to be measured, that is, the start time of the first measurement gap may be a time when the time of receiving the first of the PRS s to be measured is shifted forward by a first preset time. The first preset time being set is based on a fact that the terminal device needs to carry out RF adjustment when switching from a data communication state to a positioning measurement state. The first preset time is a time reserved for the terminal device to carry out the RF adjustment. When the first of the PRSs to be measured is measured, the terminal device has completed the RF adjustment, and can start the measurement immediately, thus achieving the purpose of reducing the positioning delay.

The first preset time may be agreed in the protocol, or may be determined according to the capability of the terminal device, or may be determined autonomously by the terminal device, which is not specifically limited by the embodiments of the present disclosure.

The end time of the first measurement gap may be determined autonomously by the terminal device, or may be notified to the terminal device by the LMF, which is not specifically limited in the embodiments of the present disclosure. For example, the terminal device can determine the end time of the first measurement gap according to the time period in which the PRS to be measured is located. For another example, the LMF can determine the end time of the first measurement gap according to the time domain resource location of the PRS to be measured, and send the end time of the first measurement gap to the terminal device, so that the terminal device can obtain the end time of the first measurement gap.

Embodiments of the present disclosure are not specifically limited to the end time of the first measurement gap. For example, the end time of the first measurement gap may be a reception time (i.e., the reception completion time) of the last of the PRSs to be measured. For another example, the end time of the first measurement gap may be later than the reception time of the last of the PRSs to be measured. That is, the end time of the first measurement gap may be a time when the reception time of the last of the PRSs to be measured is shifted backward by a second preset time. The second preset time being set is based on that after performing measurement on the PRS to be measured, some data processing is needed to be performed by the terminal device to generate a measurement report. The second preset time is a time reserved for the data processing by the terminal device.

The second preset time may be agreed in the protocol, or may be determined according to the capability of the terminal device, or may be determined autonomously by the terminal device, which is not specifically limited by the embodiments of the present disclosure.

In embodiments of the present disclosure, whether the terminal device enters the measurement gap autonomously according to different scenes can be determined. For example, different scenes have different requirements for positioning delay. For scenes with high delay requirements, the terminal device can enter the measurement gap autonomously. For the scene with low delay requirement, the terminal device may not enter the measurement gap autonomously, and carry out positioning measurement in the traditional way, that is, the terminal device can request the base station to reconfigure the measurement gap. For example, different terminal devices have different measurement capabilities. Some terminal devices support positioning measurement outside the measurement gap, while others terminal devices do not support positioning measurement outside the measurement gap. If the terminal device does not support positioning measurement outside the measurement gap, the terminal device can enter the measurement gap autonomously. If the terminal device supports positioning measurement outside the measurement gap, the terminal device may not enter the measurement gap autonomously.

Determining whether the terminal device enters the measurement gap autonomously may be performed by the terminal device or by the LMF, which is not specifically limited by the embodiments of the present disclosure. If it is determined by the LMF whether the terminal device enters the measurement gap autonomously, the LMF may send a determination result to the terminal device. For example, the LMF sends positioning measurement information of the PRS to be measured to the terminal device, and the positioning measurement information of the PRS to be measured may include information for indicating whether the terminal device is allowed to enter the measurement gap autonomously.

The scheme of the embodiment of the present disclosure is described in detail below by taking the terminal device determining whether the terminal device can enter the measurement gap autonomously as an example.

The terminal device can determine whether the terminal device is allowed to enter the measurement gap autonomously according to quality of service (QoS) information and/or capability information of the terminal device. The autonomous entry of the terminal device into the measurement gap can indicate that the terminal device directly performs positioning measurement in the first measurement gap determined autonomously. The QoS information may be sent to the terminal device by the LMF.

At present, multiple QoS levels are introduced in the protocol. The positioning client can indicate a QoS level including a precision value and a response time to the LMF. Each QoS level corresponds to at least one of a horizontal precision value, a vertical precision value, and a response time. The positioning client can send QoS information to the LMF through a gateway mobile location center (GMLC) or the AMF. The QoS information includes a QoS level, a precision value, and a response time.

After the positioning client indicates the QoS information to the LMF, the LMF can request the positioning measurement or estimation from the terminal device through the LTE positioning protocol (LPP). The LPP request location information may include QoS information, and the QoS information may include at least one of a QoS level, a horizontal precision value, a vertical precision value, and a response time.

In some embodiments, the terminal device may determine whether to enter the measurement gap autonomously based on the QoS information. Alternatively, the QoS information may be included in the positioning measurement information of the PRS to be measured. There is a corresponding relationship between the QoS information and whether the terminal device enters the measurement gap autonomously. For example, the terminal device can autonomously enter the measurement gap at some QoS levels, and may not enter the measurement gap autonomously at other QoS levels. After receiving the QoS information, the terminal device can determine whether the terminal device can enter the measurement gap autonomously according to the above corresponding relationship.

The corresponding relationship between the QoS information and whether the terminal device enters the measurement gap autonomously may be specified in the protocol, or may be notified to the terminal device by the LMF or the base station. For example, the LMF may send the corresponding relationship to the terminal device through the LPP, or the base station may send the corresponding relationship to the terminal device through RRC signaling.

In other embodiments, the terminal device may determine whether to enter the measurement gap autonomously based on the capability information of the terminal device. The capability information of the terminal device may include whether the terminal device supports positioning measurement outside the measurement gap (e.g., whether the terminal device is able to simultaneously perform data communication and positioning measurement). If the terminal device supports positioning measurement outside the measurement gap, the terminal device may not enter the measurement gap autonomously. If the terminal device does not support positioning measurement outside the measurement gap, the terminal device can enter the measurement gap autonomously.

In other embodiments, the terminal device may determine whether to enter the measurement gap autonomously based on the QoS information and the capability information of the terminal device. For example, if the terminal device does not support positioning measurement outside the measurement gap, and it is determined according to QoS information that the terminal device needs to enter the measurement gap autonomously, the terminal device enters the measurement gap autonomously. On the contrary, in other cases, the terminal device may not enter the measurement gap autonomously.

For example, the terminal device can first determine whether the terminal device supports positioning measurement outside the measurement gap according to the capability information of the terminal device. If the terminal device supports positioning measurement outside the measurement gap, the terminal device may not enter the measurement gap autonomously. If the terminal device does not support positioning measurement outside the measurement gap, the terminal device can further determine whether the terminal device needs to enter the measurement gap autonomously according to the QoS information. If the QoS information corresponds to that the terminal device enters the measurement gap autonomously, the terminal device enters the measurement gap autonomously. If the QoS information corresponds to that the terminal device does not enter the measurement gap autonomously, the terminal device does not enter the measurement gap autonomously.

The foregoing describes the technical solutions of embodiments of the disclosure by taking the terminal device determining whether the terminal device can enter the measurement gap autonomously as an example. It can be understood that the LMF may also determine whether the terminal device is allowed to enter the measurement gap autonomously in a manner similar to a manner described above. For example, the LMF may also determine whether the terminal device enters the measurement gap autonomously according to QoS information and/or capability information of the terminal device, which are not repeated for the sake of brevity.

A manner in which the LMF determines whether the terminal device enters the measurement gap autonomously can ensure that the measurement gap is controlled in a system device. The LMF can inform the base station whether the terminal device enters the measurement gap autonomously as soon as possible after determining whether the terminal device enters the measurement gap autonomously. The LMF can inform the base station that the terminal device enters the measurement gap autonomously before the terminal device enters the measurement gap autonomously, so as to ensure the effective scheduling of the base station and to reduce the interference.

The information of the first measurement gap may be transmitted based on first information. The first information may include at least one of: QoS information for providing location services for the terminal device, capability information of the terminal device, and information for indicating whether the terminal device is allowed to enter the measurement gap autonomously.

As described above, the first information may be configured for determining whether the terminal device enters the measurement gap autonomously. If it is determined that the terminal device enters the measurement gap autonomously, the terminal device and/or the LMF may transmit the information of the first measurement gap to the base station. If it is determined that the terminal device does not enter the measurement gap autonomously, the terminal device and/or the LMF may not transmit the information of the first measurement gap to the base station.

The terminal device and/or the LMF may also send first indication information to the base station. The first indication information is configured for indicating whether the terminal device enters the first measurement gap autonomously. The terminal device or the LMF may implicitly indicate whether the terminal device enters the first measurement gap autonomously through the information of the first measurement gap without sending the first indication information to the base station. For example, if information of the first measurement gap is received, the base station may determine that the terminal device will autonomously enter the first measurement gap. That is, the information of the first measurement gap may be configured to instruct to the base station that the terminal device enters the first measurement gap autonomously. If the information of the first measurement gap is not received, the base station may default that the terminal device does not enter the first measurement gap autonomously.

After receiving the information of the first measurement gap, the base station can schedule data outside the first measurement gap instead of within the first measurement gap, thereby preventing data communication from colliding with positioning measurement.

The terminal device and/or the LMF may also transmit second information to the base station. The second information is configured for indicating the end of measurement in the first measurement gap to the base station. After the second information is received, the base station can determine that the positioning measurement of the terminal device is finished, and the base station can perform data scheduling for the terminal device.

As an example, the terminal device may send the second information to the base station after the positioning measurement is completed. The second information may be a physical uplink control channel (PUCCH) scheduling request (SR). After the end of the measurement, the terminal device may send a PUCCH SR to the base station. The PUCCH SR is used for requesting uplink resources to report measurement results. After receiving the PUCCH SR, the base station can determine that the measurement in the first measurement gap is finished.

Figure 5:
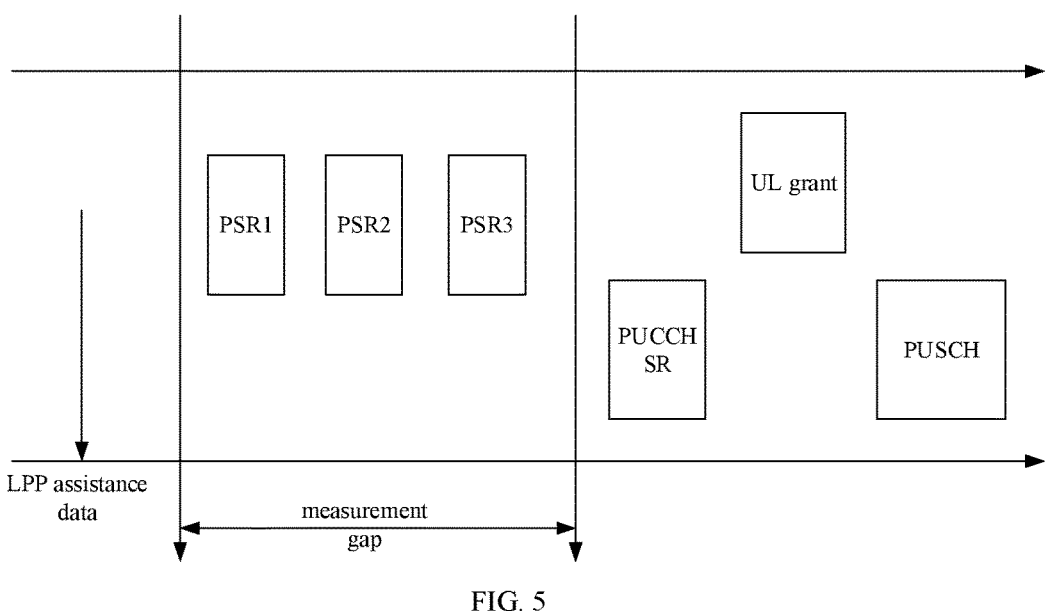
FIG. 5 is a schematic diagram of a method for reporting measurement results by a terminal device according to embodiments of the present disclosure.

The process of the positioning measurement is described below with reference to FIG. 5.

The terminal device performs measurement on PSR1, PSR2, and PSR3 within the measurement gap. After the measurement is finished, the terminal device can send a PUCCH SR to the base station. After receiving the PUCCH SR, the base station can schedule a physical uplink shared channel (PUSCH) for the terminal device through PUCCH uplink (UL) grant, such that the terminal device sends the measurement result to the base station by using the PUSCH.

In addition to implicitly indicating the end of measurement of the first measurement gap through the PUCCH SR, the terminal device may also send separate indication information to the base station to indicate the end of measurement in the first measurement gap.

As another example, the LMF may consider the end of measurement of the terminal device after receiving the measurement result reported by the terminal device. Furthermore, the LMF may send second information to the base station to indicate the end of measurement in the first measurement gap.

As can be seen from the above description, the positioning measurement information of the PRS to be measured may include at least one of the following information: positioning assistance information, QoS information for providing location service (LCS) for the terminal device, information for indicating whether the terminal device is allowed to enter the measurement gap autonomously, configuration information of the PRS to be measured, a start time of the first measurement gap, and an end time of the first measurement gap. The positioning measurement information of the PRS to be measured can be configured to determine whether the terminal device can autonomously enter the measurement gap and/or the information of the first measurement gap, etc.

The method in embodiments of the present disclosure will be described in detail from a system flow perspective with reference to FIGS. 6 and 7 below.

Figure 6:
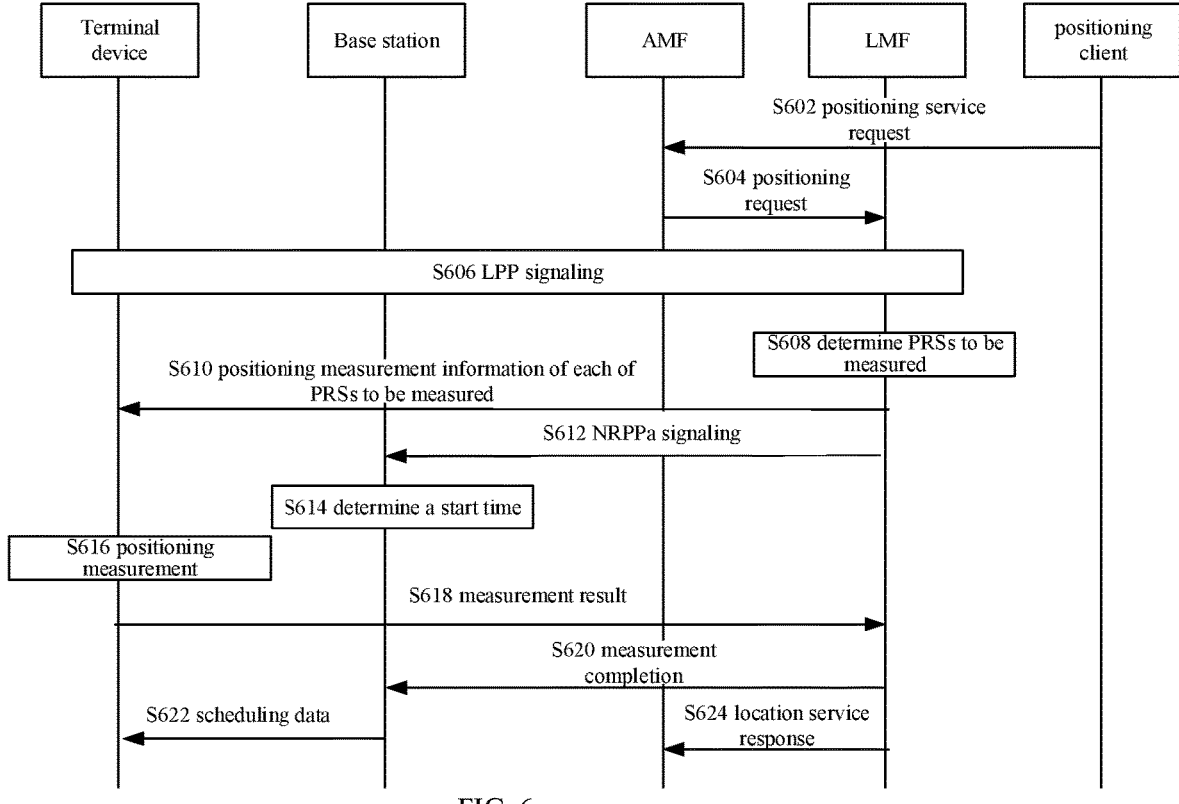
FIG. 6 is a schematic flow chart of a method for wireless communication according to other embodiments of the present disclosure.

FIG. 6 is a schematic flow chart of a method in which the LMF notifies the base station of information of a first measurement gap.

At S602, a positioning entity transmits a positioning service request to the AMF.

At S604, the AMF transmits a positioning request to the LMF.

At S606, the LMF and the terminal device perform information interaction on positioning measurement information through LPP signaling. The LMF obtains information about the positioning measurement capabilities of the terminal device.

At S608, the LMF determines PRSs to be measured that are needed to be measured by the terminal device.

At S610, the LMF sends the positioning measurement information of each of the PRSs to be measured to the terminal device. The positioning measurement information includes at least one of the following information: positioning assistance information, QoS information for providing location services, information for indicating whether the terminal device is allowed to enter the measurement gap autonomously, configuration information of the PRS to be measured (PRS to be measured that is needed to be measured by the terminal device), a start time of the first measurement gap, and an end time of the first measurement gap.

At S612, the LMF transmits NRPPa signaling to the base station, and the NRPPa signaling is configured for informing the base station that the terminal device is about to enter the measurement gap autonomously. The NRPPa signaling includes at least one of the following information: information about that the terminal device is about to perform positioning measurement, information for indicating whether the terminal device is allowed to enter the measurement gap autonomously, the start time of the first measurement gap, the end time of the first measurement gap, and the pattern serial number of the first measurement gap.

If the pattern serial number of the first measurement gap is included in the NRPPa signaling, the base station may query the measurement gap configuration table (as shown in Table 1) to determine a first measurement gap length and a first measurement gap repetition period. The base station can determine an end time of the first measurement gap according to the first measurement gap length and the first measurement gap repetition period, and schedule data for the terminal device outside the first measurement gap.

At S614, the base station determines according to the NRPPa signaling a start time at which the terminal device enters the first measurement gap, and stops scheduling an uplink data packet and a downlink data packet for the terminal device from the start time.

At S616, the terminal device performs positioning measurement. The terminal device can directly carry out positioning measurement on the PRS to be measured in the time period during which the PRS to be measured is located.

At S618, the terminal device reports a measurement result to the LMF.

At S620, after receiving the measurement result sent by the terminal device, the LMF may send a measurement completion message to the base station to indicate completion of measurement in the first measurement gap.

At S622, after receiving the measurement completion message, the base station can exit the first measurement gap and start scheduling uplink data packets and downlink data packets for the terminal device.

At S624, the LMF transmits a location service response to the AMF.

Figure 7:
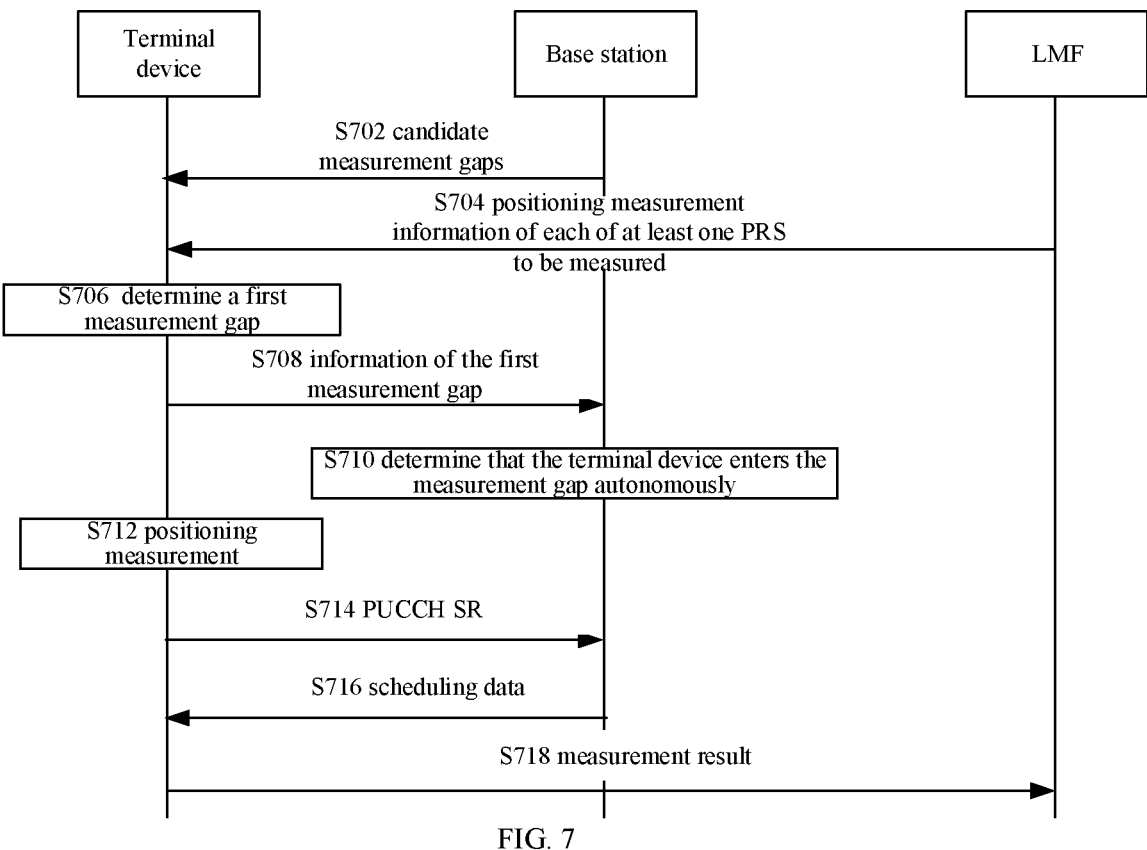
FIG. 7 is a schematic flow chart of method for wireless communication according to other embodiments of the present disclosure.

FIG. 7 is a flow chart of a method in which a terminal device notifies a base station of information of a first measurement gap.

At S702, the base station transmits candidate measurement gaps to the terminal device.

At S704, the LMF sends positioning measurement information of each of a plurality of PRSs to be measured to the terminal device. The positioning measurement information includes at least one of following information: positioning assistance information, QoS information for providing location services, information for indicating whether the terminal device is allowed to enter the measurement gap autonomously, configuration information of each PRS to be measured (PRS to be measured that is needed to be measured by the terminal device), a start time of the first measurement gap, and an end time of the first measurement gap.

At S706, the terminal device selects a first measurement gap from the candidate measurement gaps according to the positioning measurement information of each of the plurality of PRSs to be measured.

At S708, the terminal device transmits information of the first measurement gap to the base station through UCI. The information of the first measurement gap may be configured for indicating the base station that the terminal device will autonomously enter the first measurement gap. The information of the first measurement gap includes a pattern serial number of the first measurement gap.

At S710, after receiving the information of the first measurement gap, the base station determines that the terminal device enters the first measurement gap autonomously. The base station determines a length and a repetition period of the first measurement gap according to the pattern serial number of the first measurement gap, and stops scheduling data within the first measurement gap and schedules data outside the first measurement gap.

At S712, the terminal device performs positioning measurement on the plurality of PRSs to be measured.

At S714, after the measurement is finished, the terminal device can send a PUCCH SR to the base station to request an uplink resource for reporting the measurement result.

At S716, the base station receives the PUCCH SR sent by the terminal device and can schedule a PUSCH for the terminal device through PDCCH UL grant. In addition, when the base station receives the PUCCH SR, the base station can determine the end of measurement of the terminal device. Furthermore, the base station may schedule data for the terminal device.

At S718, the terminal device reports the measurement result to the LMF. The terminal device can send the measurement result through the PUSCH scheduled by the base station.

The method in embodiments of the present disclosure is described in detail above with reference to FIGS. 1 to 7 and the apparatus/device in embodiments of the present disclosure will be described in detail below with reference to FIGS. 8 to 11. It shall be understood that the description of the method in embodiments and the description of the apparatus/device in embodiments correspond to each other, and therefore for portions not described in detail, reference may be made to the preceding method embodiments.

Figure 8:
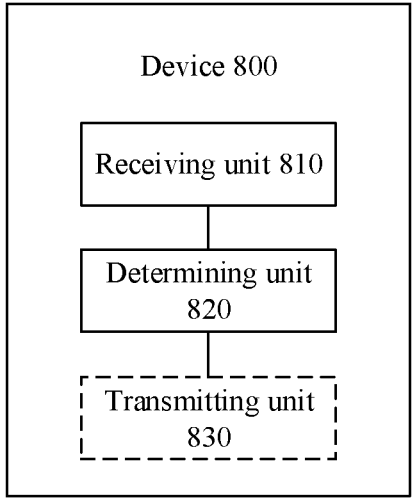
FIG. 8 is a schematic diagram of a device for wireless communication according to embodiments of the present disclosure.

FIG. 8 is a schematic diagram of a device for wireless communication provided in embodiments of the present disclosure. The device 800 in FIG. 8 may be any of the terminal devices described above. The device 800 may include a receiving unit 810 and a determining unit 820.

The receiving unit 810 is configured to receive positioning measurement information of each of a plurality of PRSs to be measured sent by LMF.

The determining unit 820 is configured to determine a first measurement gap for positioning measurement of the plurality of PRSs to be measured according to the positioning measurement information of each of the plurality of PRSs to be measured.

The information of the first measurement gap is transmitted to the base station by the terminal device and/or the LMF.

Optionally, the information of the first measurement gap includes a sequence number of the first measurement gap.

Optionally, the first measurement gap is one of a plurality of candidate measurement gaps.

Optionally, the information of the first measurement gap is transmitted to the base station by the terminal device and/or the LMF after a positioning service request.

Optionally, a start time of the first measurement gap is earlier than a time point of receiving the first of PRSs to be measured.

Alternatively, a time point at which the terminal device and/or the LMF send the information of the first measurement gap to the base station is earlier than a time point at which the first of PRSs to be measured is received.

Optionally, the information of the first measurement gap includes at least one of a pattern serial number of the first measurement gap, a start time of the first measurement gap, and an end time of the first measurement gap.

Optionally, the information of the first measurement gap is transmitted by the terminal device to the base station through UCI.

Optionally, the information of the first measurement gap is transmitted by the LMF to the base station through NRPPa signaling.

Optionally, the information of the first measurement gap is configured for instructing to the base station that the terminal device enters the first measurement gap autonomously.

Optionally, the positioning measurement information of the PRS to be measured includes at least one of the following information: positioning assistance information, QoS information for providing location services for the terminal device, information for indicating whether the terminal device is allowed to enter the measurement gap autonomously, configuration information of the PRS to be measured, a start time of the first measurement gap, and an end time of the first measurement gap.

Optionally, the information of the first measurement gap is transmitted based on first information, and the first information includes at least one of QoS information for providing location services for the terminal device, capability information of the terminal device, and information for indicating whether the terminal device is allowed to enter the measurement gap autonomously.

Alternatively, the determining unit 820 is specifically configured to select the first measurement gap from the plurality of candidate measurement gaps according to the configuration information of each of the plurality of PRSs to be measured.

Optionally, the device 800 further includes a transmitting unit 830, and the transmitting unit 830 is configured to transmit second information to the base station, where the second information is configured for indicating the base station the end of measurement in the first measurement gap.

Optionally, the second information is a PUCCH SR.

Figure 9:
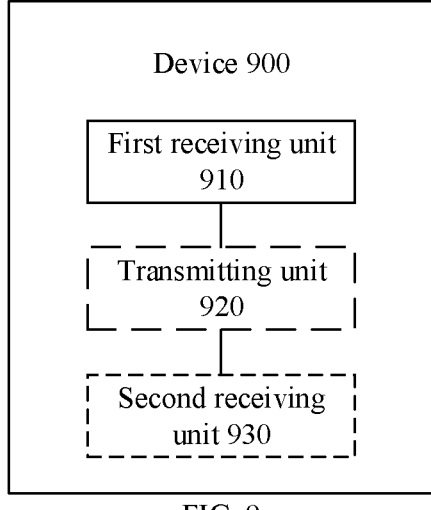
FIG. 9 is a schematic diagram of a device for wireless communication according to other embodiments of the present disclosure.

FIG. 9 is a schematic diagram of a device for wireless communication according to embodiments of the present disclosure. The device 900 in FIG. 9 may be any of the base stations described above. The device 900 may include a first receiving unit 910.

The first receiving unit 910 is configured to receive information of a first measurement gap sent by the terminal device and/or the LMF, and the first measurement gap is determined by the terminal device according to positioning measurement information of each of the plurality of PRSs to be measured.

Optionally, the information of the first measurement gap includes a sequence number of the first measurement gap.

Optionally, the first measurement gap is one of a plurality of candidate measurement gaps.

Optionally, the information of the first measurement gap is transmitted by the terminal device and/or the LMF to the base station after a positioning service request.

Optionally, a start time of the first measurement gap is earlier than a time point at which the first of PRSs to be measured is received.

Alternatively, a time point at which the terminal device and/or the LMF send the information of the first measurement gap to the base station is earlier than a time point at which the first of PRSs to be measured is received.

Optionally, the information of the first measurement gap includes at least one of following information: a pattern serial number of the first measurement gap, a start time of the first measurement gap, and an end time of the first measurement gap.

Alternatively, the first receiving unit 910 is specifically configured to receive the information of the first measurement gap transmitted by the terminal device through UCI.

Alternatively, the first receiving unit 910 is specifically configured to receive the information of the first measurement gap transmitted by the LMF through NRPPa signaling.

Optionally, the information of the first measurement gap is configured to instruct to the base station that the terminal device enters the first measurement gap autonomously.

Optionally, the positioning measurement information of the PRS to be measured includes at least one of following information: positioning assistance information, QoS information for providing location services for the terminal device, information for indicating whether the terminal device is allowed to enter the measurement gap autonomously, configuration information of the PRS to be measured, a start time of the first measurement gap, and an end time of the first measurement gap.

Optionally, the information of the first measurement gap is transmitted based on first information, and the first information includes at least one of QoS information for providing location services for the terminal device, capability information of the terminal device, and information for indicating whether the terminal device is allowed to enter the measurement gap autonomously.

Optionally, the device 900 further includes a transmitting unit 920. The transmitting unit 920 is configured to transmit configuration information of each of a plurality of measurement gaps to the terminal device, where the configuration information of each of the plurality of measurement gaps is used for the terminal device to select the first measurement gap.

Optionally, the device 900 further includes a second receiving unit 930. The second receiving unit 930 is configured to receive second information transmitted by the terminal device and/or the LMF, where the second information is configured for indicating the end of measurement in the first measurement gap to the base station.

Optionally, the second information is transmitted by the terminal device, and the second information is a PUCCH SR.

Figure 10:
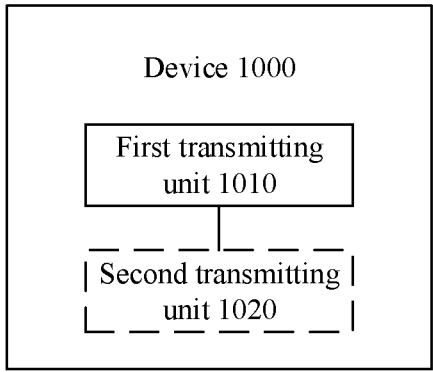
FIG. 10 is a schematic diagram of a device for wireless communication according to other embodiments of the present disclosure.

FIG. 10 is a schematic diagram of a device for wireless communication according to embodiments of the present disclosure. The device 1000 in FIG. 10 has a location management function and the device 1000 may be any LMF described above. The device 1000 may include a first transmitting unit 1010.

The first transmitting unit 1010 is configured to send positioning measurement information of each of a plurality of PRSs to be measured to the terminal device, and the positioning measurement information of each of the plurality of PRSs to be measured is used for the terminal device to determine a first measurement gap for positioning measurement of the plurality of PRSs to be measured. The information of the first measurement gap is transmitted to the base station by the terminal device and/or the LMF.

Optionally, the information of the first measurement gap includes a sequence number of the first measurement gap.

Optionally, the first measurement gap is one of a plurality of candidate measurement gaps.

Optionally, the information of the first measurement gap is transmitted by the terminal device and/or the LMF to the base station after a positioning service request.

Optionally, a start time of the first measurement gap is earlier than a time point at which the first of PRSs to be measured is received.

Alternatively, a time point at which the terminal device and/or the LMF send information of the first measurement gap to the base station is earlier than a time point at which the first of PRSs to be measured is received.

Optionally, the information of the first measurement gap includes at least one of the following information: a pattern serial number of the first measurement gap, a start time of the first measurement gap, and an end time of the first measurement gap.

Optionally, the information of the first measurement gap is transmitted by the terminal device to the base station through UCI.

Optionally, the information of the first measurement gap is transmitted by the LMF to the base station through NRPPa signaling.

Optionally, the information of the first measurement gap is configured to indicate the base station that the terminal device enters the first measurement gap autonomously.

Optionally, the positioning measurement information of the PRS to be measured includes at least one of following information: positioning assistance information, QoS information for providing location services for the terminal device, information for indicating whether the terminal device is allowed to enter the measurement gap autonomously, configuration information of the PRS to be measured, a start time of the first measurement gap, and an end time of the first measurement gap.

Optionally, the information of the first measurement gap is transmitted based on first information. The first information may include at least one of: QoS information for providing location services for the terminal device, capability information of the terminal device, and information for indicating whether the terminal device is allowed to enter the measurement gap autonomously.

Optionally, the device 1000 further includes a second transmitting unit 1020. The second transmitting unit 1020 is configured to transmit second information to the base station, where the second information is configured for indicating end of measurement in the first measurement gap to the base station.

Figure 11:
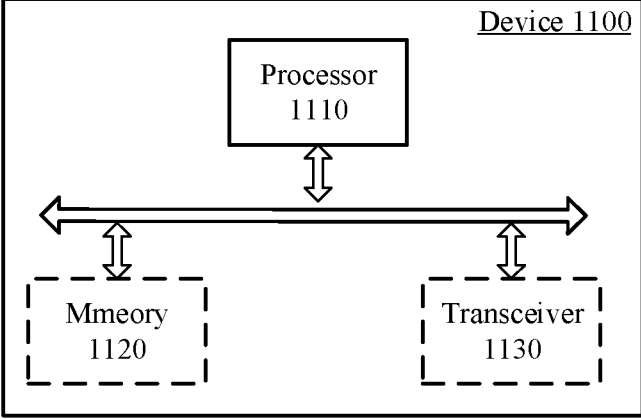
FIG. 11 is a schematic structural diagram of a communication device according to embodiments of the present disclosure.

FIG. 11 is a schematic structural diagram of a device for wireless communication according to an embodiment of the present disclosure. The dotted line in FIG. 11 indicates that the unit or module is optional. The device 1100 may be used to implement the methods described in the above method embodiments. The device 1100 may be a chip, a terminal device, a base station, or an LMF.

The device 1100 may include one or more processors 1110. The processor 1110 may support the device 1100 to implement the methods described previously in the method embodiments. The processor 1110 may be a general-purpose processor or a special purpose processor. For example, the processor could be a central processing unit (CPU). Alternatively, the processor may also be other general-purpose processors, digital signal processors (DSP), application specific integrated circuits (ASIC), field programmable gate arrays (FPGA), or other programmable logic devices, discrete gate or transistor logic devices, discrete hardware components, and the like. The general-purpose processor may be a microprocessor or the processor may be any conventional processor or the like.

The device 1100 may also include one or more memories 1120. The memory 1120 stores a program that can be executed by the processor 1110, such that the processor 1110 performs the methods described previously in the method embodiments. The memory 1120 may be independent of the processor 1110 or may be integrated within the processor 1110.

The device 1100 may also include a transceiver 1130. The processor 1110 may communicate with other devices or chips through the transceiver 1130. For example, the processor 1110 may transmit and receive data with other devices or chips through the transceiver 1130.

Embodiments of the disclosure further provide a non-transitory computer-readable storage medium for storing programs. The non-transitory computer-readable storage medium may be applied to a terminal or a network device provided by embodiments of the present disclosure, and the program causes a computer to perform a method performed by the terminal or the network device in various embodiments of the present disclosure.

Embodiments of the disclosure further provide a computer program product. The computer program product includes programs. The computer program product may be applied to a terminal or network device provided by embodiments of the present disclosure, and the program causes a computer to perform a method performed by the terminal or network device in various embodiments of the present disclosure.

Embodiments of the disclosure further provide a computer program. The computer program may be applied to a terminal or network device provided by embodiments of the present disclosure, and the computer program causes a computer to perform a method performed by the terminal or the network device in various embodiments of the present disclosure.

It shall be understood that, in embodiments of the present disclosure, "B corresponding to A" means that B is associated with A, according to which B may be determined. It is also to be noted that determining B according to A does not mean determining B only according to A. B may be determined according to A and/or other information.

It shall be understood that the term "and/or" as used herein is merely an association relationship that describes an associated object, indicating that there can be three relationships. For example, for A and/or B, there can be three cases: A exists alone, A and B exist at the same time, and B exists alone. In addition, the character "/" herein generally indicates that the related objects are a kind of "or" relationship.

It shall be understood that in various embodiments of the present disclosure, the size of the sequence number of the above-mentioned processes does not mean the order of execution, and the execution order of each process should be determined by its function and inherent logic, and should not be limited in any way to the implementation process of the embodiments of the present disclosure.

In the implementations of the disclosure, it shall be understood that, the system, the apparatus/device, and the method disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling, or direct coupling, or communication connection between each illustrated or discussed components may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit.

In the above-described embodiments, it may be implemented in whole or in part by software, hardware, firmware, or any combination thereof. When implemented in software, it can be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer may be a general-purpose computer, a special purpose computer, a computer network, or other programmable device. The computer instructions may be stored in a computer-readable storage medium or transmitted from one computer-readable storage medium to another computer-readable storage medium. For example, the computer instructions may be transmitted from one Web site, computer, server, or data center to another Web site, computer, server, or data center via a wired manner (e.g., coaxial cable, optical fiber, digital subscriber line (DSL)) or a wireless manner (e.g., infrared, wireless, microwave, etc.). The computer-readable storage medium may be any usable medium that a computer can read or a data storage device such as a server, data center, or the like that includes one or more usable media integration. The usable media may be magnetic media (e.g., floppy disk, hard disk, magnetic tape), optical media (e.g., digital video disc (DVD)), or semiconductor media (e.g., solid state disk (SSD)), etc.

The above-mentioned is only the specific implementation of the present disclosure, but the scope of protection of the present disclosure is not limited thereto. Any technical person familiar with the technical field who can easily think of changes or substitutions within the technical scope disclosed in the present disclosure should be covered within the scope of protection of the present disclosure. Therefore, the scope of protection of the present disclosure shall be subject to the scope of protection of the claims.

What is claimed is:

1. A method for wireless communication, comprising:
   determining, by a terminal device, whether the terminal device can enter measurement gap autonomously based on a quality of service (QoS) level included in QoS information received by the terminal device from a location management function (LMF) and a corresponding relationship between QoS levels and whether the terminal device can enter measurement gap autonomously, wherein each QoS level corresponds to a precision value and a response time to the LMF, and wherein the corresponding relationship between QoS levels and whether the terminal device can enter measurement gap autonomously is received by the terminal device from the LMF through a long term evolution (LTE) positioning protocol (LPP);
   receiving, by the terminal device, positioning measurement information of positioning reference signal (PRS) from the LMF;
   determining a first measurement gap for positioning measurement of PRS based on shifting a time of PRS forward by a preset time;
   transmitting, by the terminal device, information of a first measurement gap for positioning measurement of PRS to a base station; and
   performing automatic measurement by using the positioning measurement information.

2. The method of claim 1, wherein the information of the first measurement gap further includes information of an end time of the first measurement gap.

3. The method of claim 1, wherein the information of the first measurement gap is transmitted prior to a PRS to be measured by the terminal device.

4. The method of claim 1, wherein the information of the first measurement gap is transmitted to the base station by the terminal device through uplink control information (UCI); or
   the information of the first measurement gap is transmitted to the base station by the LMF through a new radio positioning protocol A (NRPPa) signaling.

5. The method of claim 1, wherein the positioning measurement information of PRS comprises quality of service (QoS) information for providing location services for the terminal device, and wherein the first measurement gap is determined based on the QoS information for providing location services for the terminal device.

6. The method of claim 1, wherein the positioning measurement information of PRS comprises information for indicating whether the terminal device is allowed to determine a measurement gap, and wherein the first measurement gap is determined based on the information for indicating whether the terminal device is allowed to determine the measurement gap.

7. The method of claim 1, wherein the positioning measurement information of PRS comprises at least one of: positioning assistance information, configuration information of PRS, a start time of a candidate measurement gap, or an end time of the candidate measurement gap.

8. The method of claim 1, further comprising:
   selecting, by the terminal device, the first measurement gap from a plurality of candidate measurement gaps, wherein the plurality of candidate measurement gaps are included in the positioning measurement information of PRS.

9. The method of claim 1, wherein the method further comprises:
   transmitting, by the terminal device to the base station, second information, wherein the second information indicates end of measurement in the first measurement gap.

10. A terminal device, comprising:
   at least one memory; and at least one processor coupled to the at least one memory and configured to cause the terminal device to perform operations comprising:

determining, by the terminal device, whether the terminal device can enter measurement gap autonomously based on a quality of service (QoS) level included in QoS information received by the terminal device from a location management function (LMF) and a corresponding relationship between QoS levels and whether the terminal device can enter measurement gap autonomously, wherein each QoS level corresponds to a precision value and a response time to the LMF, and wherein the corresponding relationship between QoS levels and whether the terminal device can enter measurement gap autonomously is received by the terminal device from the LMF through a long term evolution (LTE) positioning protocol (LPP);

receiving, by the terminal device, positioning measurement information of positioning reference signal (PRS) sent by a location management function (LMF);

determining a first measurement gap for positioning measurement of PRS based on shifting a time of PRS forward by a preset time;

transmitting, by the terminal device, information of a first measurement gap for positioning measurement of PRS to a base station; and performing automatic measurement by using the positioning measurement information.

11. The terminal device of claim 10, wherein the information of the first measurement gap further includes information of an end time of the first measurement gap.

12. The terminal device of claim 10, wherein the information of the first measurement gap is transmitted prior to a PRS to be measured by the terminal device.

13. The terminal device of claim 10, wherein the information of the first measurement gap is transmitted to the base station by the terminal device through uplink control information (UCI); or the information of the first measurement gap is transmitted to the base station by the LMF through a new radio positioning protocol A (NRPPa) signaling.

14. The terminal device of claim 10, wherein the positioning measurement information of PRS comprises quality of service (QoS) information for providing location services for the terminal device, and wherein the first measurement gap is determined based on the QoS information for providing location services for the terminal device.

15. The terminal device of claim 10, wherein the positioning measurement information of PRS comprises information for indicating whether the terminal device is allowed to determine a measurement gap, and wherein the first measurement gap is determined based on the information for indicating whether the terminal device is allowed to determine the measurement gap.

16. The terminal device of claim 10, wherein the positioning measurement information of PRS comprises at least one of: positioning assistance information, configuration information of PRS, a start time of a candidate measurement gap, or an end time of the candidate measurement gap.

17. The terminal device of claim 10, the operations further comprising:

selecting, by the terminal device, the first measurement gap from a plurality of candidate measurement gaps, wherein the plurality of candidate measurement gaps are included in the positioning measurement information of PRS.

18. The terminal device of claim 10, the operations further comprising:

transmitting, by the terminal device to the base station, second information, wherein the second information indicates end of measurement in the first measurement gap.

19. A method, comprising:

determining, by a location management function (LMF) that a terminal device can enter measurement gap autonomously based on a quality of service (QoS) level of the terminal device and a corresponding relationship between QoS levels and whether the terminal device can enter measurement gap autonomously, wherein each QoS level corresponds to a precision value and a response time to the LMF, wherein the corresponding relationship is sent to the terminal device by the LMF through a long term evolution (LTE) positioning protocol (LPP);

in response to determining that the terminal device can enter measurement gap autonomously, transmitting, by the LMF to a base station, a new radio positioning protocol A (NRPPa) signaling indicating that the terminal device can enter measurement gap autonomously; and transmitting, by the LMF to the terminal device, positioning measurement information of positioning reference signal (PRS).

\* \* \* \* \*